(12) United States Patent
de Nicolas et al.

(10) Patent No.: US 7,218,712 B2
(45) Date of Patent: May 15, 2007

(54) METHOD AND SYSTEM FOR ACCOUNTING OF SERVICES

(75) Inventors: Arturo Martin de Nicolas, Aachen (DE); Juan-Mario Martin-Sanchez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 723 days.

(21) Appl. No.: 10/610,866

(22) Filed: Jun. 30, 2003

(65) Prior Publication Data

US 2005/0078809 A1 Apr. 14, 2005

(30) Foreign Application Priority Data

Jul. 1, 2002 (EP) .................... 02077601

(51) Int. Cl.
*H04M 15/00* (2006.01)

(52) U.S. Cl. .............. 379/120; 379/114.17; 379/114.2; 379/114.27; 379/127.06

(58) Field of Classification Search .......... 379/111, 379/114.03, 114.19, 114.2, 114.27, 114.28–29, 379/115.01, 121.01, 120, 114.17, 127.06
See application file for complete search history.

(56) References Cited

U.S. PATENT DOCUMENTS

| 5,699,416 | A | * | 12/1997 | Atkins | .............. 379/115.01 |
| 6,064,887 | A | * | 5/2000 | Kallioniemi et al. | ....... 455/445 |
| 6,192,115 | B1 | | 2/2001 | Toy et al. | |
| 6,639,978 | B2 | * | 10/2003 | Draizin et al. | ......... 379/114.21 |
| 6,856,676 | B1 | * | 2/2005 | Pirot et al. | ............. 379/201.01 |
| 6,922,468 | B1 | * | 7/2005 | Dammrose et al. | .... 379/221.13 |

(Continued)

FOREIGN PATENT DOCUMENTS

EP 1 113 677 A2 7/2001

(Continued)

OTHER PUBLICATIONS

Meskauskas, Customised Applications for Mobile Enhanced Logic (CAMEL), Research Seminar on Nomadic Computing, Department of Computer Science, University of Helsinki, May 1999.

(Continued)

*Primary Examiner*—Binh K. Tieu
(74) *Attorney, Agent, or Firm*—Roger S. Burleigh

(57) ABSTRACT

Method and system for handling a service request from an originating station (ST-A) to a terminating station (ST-B) in a telecommunications system managing service logic for accounting information for payment of services.

A service request is received from an originating station (ST-A) indicating an identifier of a terminating station (ST-B). The service request is checked against number portability information related to the identifier of the terminating station (ST-B), and against accounting information of the originating station (ST-A). The service can proceed without further queries for number portability.

A service request is received for a terminating station (ST-B) indicating an identifier of an originating station (ST-A). Accounting information of the terminating station (ST-B) is updated according to number portability information related to the identifier of the originating station (ST-A).

Accounting information can be stored in a payment server (PS), such as, for example, a pre-paid server storing accounting information for pre-paid subscriptions.

32 Claims, 4 Drawing Sheets

U.S. PATENT DOCUMENTS

| | | | |
|---|---|---|---|
| 2003/0081754 A1* | 5/2003 | Esparza et al. | 379/221.01 |
| 2005/0117714 A1* | 6/2005 | Chingon et al. | 379/88.12 |
| 2006/0276179 A1* | 12/2006 | Ghaffari et al. | 455/412.2 |

FOREIGN PATENT DOCUMENTS

| | | |
|---|---|---|
| EP | 1 189 473 A2 | 3/2002 |
| WO | WO 99/51041 | 10/1999 |
| WO | WO 01/17223 A2 | 8/2000 |

OTHER PUBLICATIONS

Geulen, Hartmann, Open Service Provisioning in GSM—What do we gain with CAMEL?, Ericsson Eurolab Deutschland GmbH, Sep. 1997.

ITU-T Q.1214, Distributed Functional Plane for Intelligent Network CS-1, Oct. 1995.

ETS 300 374-1, Intelligent Network (IN); Intelligent Network Capability Set 1 (CS1); Core Intelligent Network Application Protocol (INAP); Part 1: Protocol specification, Sep. 1994.

3GPP TS 29.078 V4.40, 3$^{rd}$ Generation Partnership Project; Technical Specification Group Core Network; Customised Applications for Mobile network Enhanced Logic (CAMEL) Phase 3; CAMEL Application Part (CAP) specification (Release 4), Mar. 2002.

Schäfer, Volker: VIAG: Bei Anruf—Guthaben, www.teltarif.de—Kommunikation Ganz Einfach, 'Online!—Nov. 1, 2000 XP002224216, Retrieved from the Internet: <URL:http://www.teltarif.de/arch/2000/kw44/s3423.html>.

TMN Press: "TMN promotes mass use of mobile phones and adds a revolutionary concept to its prepaid cards: PAKO charged by Incoming calls" TMN Press Release, 'Online! Apr. 17, 2000 XP002224217 Retrieved from the Internet <URL:http://www.tmn.pt/tmn/noticias/2000_17abr_shtml>.

* cited by examiner

METHOD AND SYSTEM FOR ACCOUNTING OF SERVICES

This application claims the benefit of the filing date as provided in 35 U.S.C. 119 of European patent application number 02077601.9 filed on Jul. 1, 2002, the disclosures of which are incorporated herein by reference.

FIELD OF THE INVENTION

The present invention relates to telecommunications systems handling accounting information related to their users, and requiring to manage service requests according to said accounting information.

BACKGROUND

Telecommunications operators use to manage accounting information related to their users for the payment of services that are served to them through the telecommunication system (or systems) managed by said operators. Examples of telecommunications systems are: mobile systems, such as, for instance, a GSM system (Global System for Mobile communications) or a UMTS system (Universal Mobile Telecommunications System); fixed systems, such as, for instance, a PSTN system (Public Switched Telephone Network system) or an ISDN system (Integrated Services Digital Network); or combinations thereof.

Said accounting information uses to be updated regularly according to the services served to said users. For a given user, said accounting information can comprise, for instance, and among other data, the actual accounting balance of said user, and/or a register of the services served to said user.

Some telecommunications operators deploy a policy to check, in an early stage, if a service requested by a given user can proceed or not (e.g.: if it shall be barred), based on the actual accounting balance of said user. Said early check is intended to avoid further processing if certain conditions are not fulfilled; such as, for example, a predefined limit in the accounting balance in a post-paid subscription, or a zero credit value for a pre-paid subscription.

In most of the cases, said checking is performed just upon reception of the service request in a switching node (switching point, or SP) which is in charge of receiving and further processing (e.g.: routing, serving, signaling, etc.) service requests made from (or terminating in) the station (end-point, terminal) said user is using. Examples of switching points (SPs) are local or transit exchanges in a PSTN, MSCs (Mobile Switching Centres) or SGSNs (Serving GPRS Support Nodes) in a GSM mobile system, etc.

PRIOR ART SOLUTIONS

For a given operator, accounting information related to their users uses to be stored in one or more specialized server entities that stores, among other data (such as events related to services served to said users), information related to the respective accounting balance of these users. Each of these servers (hereinafter referred as payment servers, PSs) holds accounting information of all or a part of the users served by said operator, and usually are provided with service logic for payment of services. PSs use to be regularly updated with information events related to services in which these users are involved (such as, for example, the so called Call. Detail Records, CDRs); thus allowing a PS, as a part of its service logic, to update the accounting balance for payment of services related to the users to whom said PS holds accounting information.

Usually, also as a part of its service logic, these PSs are also in charge of granting or barring the continuation of a service requested by the station (end-point, terminal) of a user for whom it holds the corresponding accounting information.

For this purpose various state-of-art mechanisms apply wherein, for instance, a PS is queried for handling a service request (e.g.: a call request) from a user in an early stage (e.g.: just upon reception of the service request message from the user's station). The query is usually made by a switching point (SP) within the operator network which receives said service request from a given station, and which is in charge of receiving and further processing (e.g.: routing, serving, signaling, etc.) service request made from that station.

Then, the queried PS can determine if the service can proceed. Upon said determination, it can answer to said query including information for continuing or dropping service execution.

Even though PSs are characterized by their functionality (as described above), being this fully independent on their physical allocation (e.g.: if co-located within a switching point or not); the need of scalability, together with the need to implement new additional services, or enhance existing ones, minimising the impact in the existing network (i.e.: minimising the impact in the switching points and in the signaling protocols used between them), drove to align with architectures in which specialized functions serving a given application for providing or controlling a service are located as separated functional entities in specialized nodes that communicate, by means of specialized protocols, with other nodes in the network that handle the lowest aspects of the service (such as the switching points, SPs).

An example of an standardized architecture that allows the deployment of new services (and enhancement of existing ones), while minimising the impact in the existing network is the, so called, Intelligent Network (IN). IN is defined for example in ITU recommendation Q.1214; and it is characterized by a set differentiated functions (functional entities). Among other, IN defines functional entities for switching related functions (Service Switching function, SSF) and for control related functions (Service Control Function, SCF); being these entities allocated, respectively, in Service Switching Points (SSPs, referred also as switching points, SP, within this invention) and Service Control Points (SCPs).

IN is also characterized by the protocol(s) used between said SSFs and said SCFs. Examples of said protocols are INAP (Intelligent. Network Application Protocol), defined for instance in ETSI specification ETS 300 374-1 (September 1994), or CAP (Customised Applications for Mobile network Enhanced Logic, CAMEL, Application Part), defined for instance in 3GPP ($3^{rd}$ Generation Partnership Project) specification 29.078 (v4.4.0, March 2002).

In particular, CAMEL (Customised Applications for Mobile network Enhanced Logic), addresses the integration of the functional structuring of an Intelligent Network within mobile systems such as GSM or UMTS. Further details related to CAMEL are disclosed in papers such as: "*Open Service Provisioning in GSM. What do we gain with CAMEL*" (Geulen, Hartmann; September 1997; http://www.jenshartmann.de/papers/epmcc97.pdf) or "*Customised Applications for Mobile network Enhanced Logic, CAMEL*" (Meskauskas; May 1999; http://www.cs.helsinki.fi/u/kraatika/Courses/NomCom99/meskauskas.pdf).

The IN architecture allows to handle lowest aspects of a service (e.g.: for a call, message routing aspects, media handling, basic call control, etc., of said call) within SSFs allocated in the SP(s) said service traverses; while highest aspects, such as applications associated specifically to the specific service being executed, are controlled in one or more SCFs allocated in one or more SCPs.

This is accomplished, among other mechanism, by setting points (e.g.: the, so called, Detection Points, DPs in Q.1214) within the basic control logic for processing the service in a SP that would trigger the invocation of the service IN logic. In the IN model described in Q.1214, the so called Call Control Function (CCF) implements said basic control logic for processing services (such as calls or other services).

A CCF uses to be co-located with a SSF within the same SP. According to this, when the execution of a service gets a given point (e.g.: detection point, DP) the CCF invokes IN service logic by notifying internally the event said DP refers to the SSF; wherein said notification usually includes data that identify, among other, the service being executed, the state of the service, the identity of party (or parties) involved in the service, the type of IN service invoked, etc. The SSF then processes said event according to the specific IN logic; wherein said processing can include: a query to the corresponding SCF that has the service logic for handling the service at said execution point, and the subsequent answer to said query from the SCF to the SSF. Then, the SSF gives back further indications to the CCF for further proceeding with the service; wherein said indications can (according to the answer from the SCF), for example, contain parameters that will modify or replace old parameters in said service (e.g.: for a call, the original called-party-number parameter can be modified, so the call gets a new destination), or indications to continue, or even to drop, the service being requested or executed.

An example of functions and inter-relationship between a CCF and a SSF within a SP is depicted, for instance, in FIG. 4.1/a in Q.1214.

When aligning with IN architecture, a PS uses to be implemented within an SCF, while interworking with one or more SSFs that are in turn used to be allocated in switching points (SPs, SSPs) (e.g.: local exchanges in a PSTN network, MSCs or SGSNs in a mobile network, etc.). Although other alternative architecture implementations are also employed.

The aforementioned service logic for payment of services can be based on various criteria. For example, patent application WO 01/17223 shows an example of service logic based on the accounting balance of the user that request the service, and on the type of service requested.

Said patent shows an example of a PS (SCP/PPC) arranged to store and handle pre-paid accounting information, and entitled for granting or barring the continuation of a service request (call request in this case) from a station. The PS (SCP/PPC), according to the example shown in patent WO 01/17223, is allocated in a Service Control Point (SCP) of an Intelligent Network. The patent discloses a method in which the PS (SCP/PPC) is queried from a SP (MSC/SSP) for continuing or deny the execution of a call request; wherein the service logic in said PS is further arranged to handle said query according to the type of call requested by the calling user (e.g.: fax, voice, data, etc.), which is also included in the query.

For example, the service logic for payment of services can also be based on the accounting balance of the user that request the service, and on the destination of the service.

Telecommunications operators normally applies different tariffs to services that are requested (originated) from their users. A criteria for said different tariffs use to be related to the location of the end-point (i.e.: station, terminal) which is the destination of the service. For instance, a telecommunications operator uses to apply different tariffs and charging rates to services (e.g.: calls) requested between their users and those requested towards users of another operator. In addition, different base tariffs can also apply to services requested by other users that are subscribers of other operators and that use its own network (e.g.: due to, for instance, a roaming agreement between operators).

In these cases, upon reception of, for example, a call request from a calling terminal, the PS receives a query as in the previous cited case. The query comprises the identifier for the destination of the call that has been dialed by the calling user, and the PS performs a check to determine if the accounting balance associated to the calling terminal is sufficient to support a call to said destination according to its corresponding tariff. For this purpose, PSs use to be configured with information that relates identifiers with their corresponding locations and/or with tariffs associated to these locations.

Furthermore, some operators can apply policies that bonus to their users (e.g.: by crediting their corresponding accounting balance) according to the location of the origination; e.g.: when they receive calls from another operator.

In cases wherein the service logic for payment of services is based, among any other criteria, in the destination or origination of the service, it should be desirable to obtain as much information as possible regarding said destination or origination for processing the service accordingly.

SUMMARY OF THE INVENTION

The present invention provides methods for handling payment of services, as well as for handling service requests, according to number portability information related to an identifier of a party involved in the service.

According to one aspect of the present invention, it is provided a method and an apparatus for handling payment of services in a telecommunications system. The method and apparatus comprises the steps of, and the means for: (a) receiving a query for handling a service in a payment server entity that has service logic for handling accounting information for payment of services, wherein said query contains an identifier of a given station (or of its user) involved in said service; (b) obtaining number portability information related to said identifier; and (c) further handling said query according to said portability information, instead of handling it according to said identifier.

This aspect allows the service logic in a payment server entity to process said query according to a more certain information regarding the location of any of the parties involved in the service.

According to a further aspect, the invention provides a telecommunications system and a method for handling a service request requested from an originating station to a terminating station. The method and system comprises the steps of, and means for: (a) receiving a service request in said telecommunications system from the originating station comprising an identifier of said terminating station; (b) identifying the accounting information related to the originating station; (c) obtaining number portability information related to the identifier of said terminating station; and (d) checking if the service requested by the originating station can proceed according to the accounting information related to said originating station and according to the obtained portability information for said terminating station.

This aspect allows, upon a service request, an early check to determine if a service can proceed according to accounting information related to the requesting party and according to more certain information regarding the destination point of the service.

According to a further aspect, the invention provides a telecommunications system and a method for handling a service request requested towards a terminating station from an originating station. The method and system comprises the steps of, and means for: (a) receiving a service request in said telecommunications system to the terminating station comprising an identifier of said originating station; (b) obtaining number portability information related to the identifier of said originating station; (c) identifying the accounting information related to the terminating station; and (d) updating the accounting information related to the terminating station according to the obtained portability information for said originating station.

This aspect allows, upon reception of a service terminating in a given party, to act upon the accounting data of said party according to more certain information regarding the origination point of the service.

BRIEF DESCRIPTION OF DRAWINGS

The features, objects and advantages of the invention will become apparent by reading this description in conjunction with the accompanying drawings, in which.

DETAILED DESCRIPTION OF PREFERRED EMBODIMENTS

Embodiments of the present invention shall now be described in detail with reference to FIGS. 1 to 4.

Figure 1:
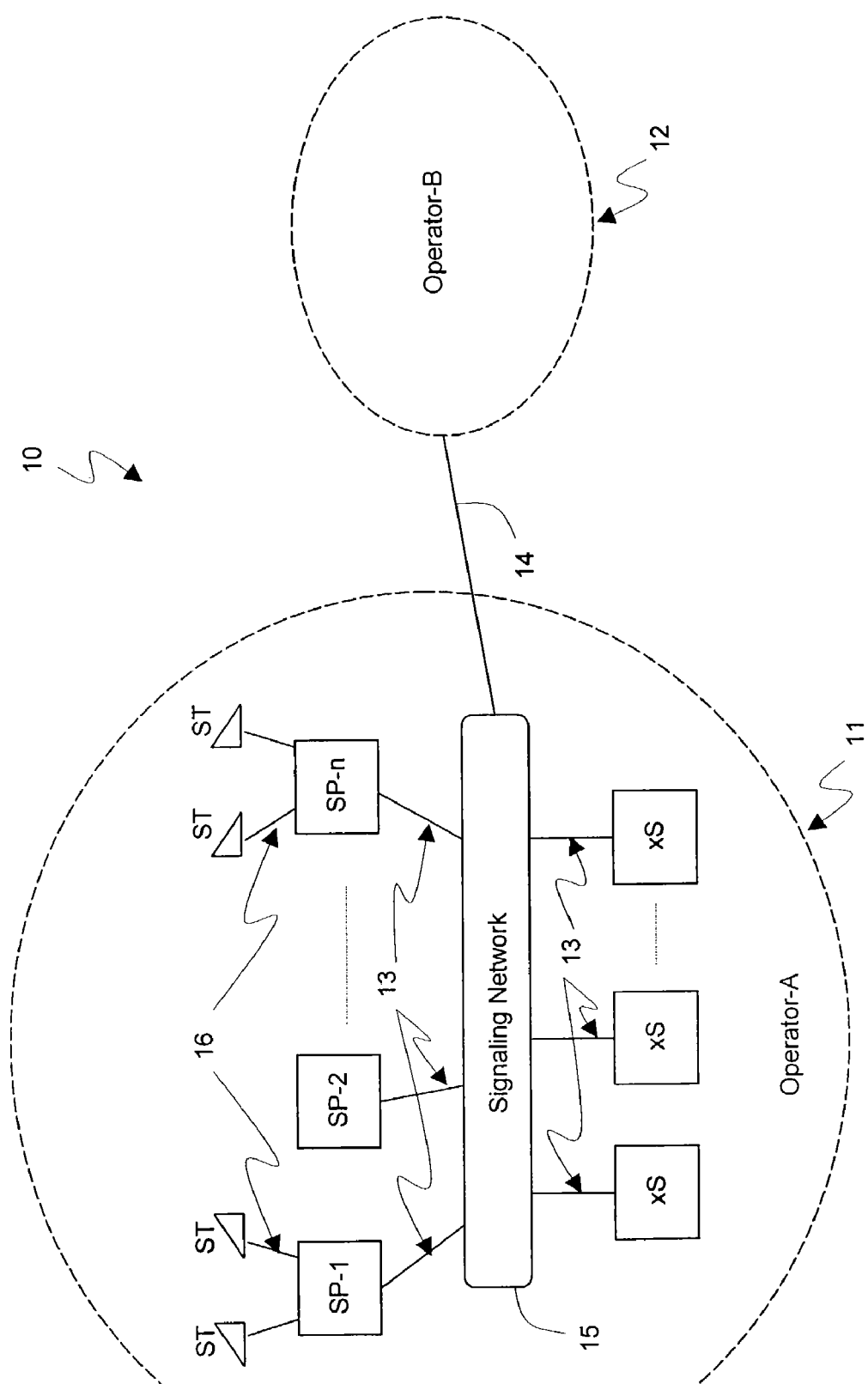
FIG. 1 shows an schematic view of a state-of-art telecommunications system.

In FIG. 1 it is depicted a simplified view of a generic telecommunications system (10) showing, as an example, two inter-connected network domains (11, 12) of two different operators (Operator-A, Operator-B); wherein elements of one of them (Operator-A) are schematically represented.

Different telecommunication technologies used in telecommunications systems use to imply different and specialized elements, such as communication nodes, communication links, etc. . . FIG. 1 intends to represent those elements that use to be common for most of them, in which:

switching points (SP-1, SP-2, SP-n) represent communication nodes in the telecommunications system arranged for handle signaling related to services, and, if proceed, to handle associated media related to said services;

stations (STs) represents the end-points of services; they can be, for instance, user terminals adapted to request and/or receive services from the telecommunications system via access points (16);

servers (xS) represent various servers having additional functions related to the provision of services and/or storage of various data related to users, services, etc.;

links (13, 14) represent the signaling links that allows switching points and servers to communicate (i.e.: exchange signaling) through a signaling network (15) of a given operator, as well as to exchange signaling with other signaling networks of other operators;

signaling network (15) represents a the set of interconnected (by means of signaling links) signaling transfer points (not represented) involved in routing/transportation of signaling.

Media links, through which media related to services requiring media transfer (such as voice calls, video conferences calls, data transfer calls, etc.) are not explicitly represented (for simplicity reasons) in FIG. 1. Depending on different technologies, media can be transferred through media links that share the same physical links with the signaling links (13, 14) (e.g.: multiplexed in time or frequency domain, exchanged through different transport connections in a packet switched data network, etc.), or through separate physical links.

As should be understood hereinafter, details dealing with the specific aspects that characterize said elements (switching points, stations, servers) for a specific telecommunication technology, as well as protocols said elements use to communicate, including specific characteristics of the signaling network(s) (15), signaling links (13, 14), or access points (16); does not affect the scope of the present invention.

Examples of switching points (SPs) in fixed (wired) systems as PSTN or ISDN, are the, so called, local exchanges, that are where user terminals (STs) for accessing said systems use to be connected to; they act as signaling end points with another SPs, and adapt said signaling to/from the appropriate signaling format (protocol) used to communicate with the STs. Other SPs in PSTN/ISDN systems can be assigned to mere transit/routing functions between SPs, having no STs belonging to them; they act as signaling transfer points for the signaling related to services.

Examples of switching points (SPs) in mobile systems, are the Mobile Switching Centres (MSCs), Gateway Mobile Switching Centres (GMSCs) or Serving Support Nodes General Packet Radio Services (Serving GPRS Support Node or SGSNs); wherein MSCs/GMSCs serve circuit-switched related services (such as voice calls via circuit-switch), and SGSNs serves packet-switched related services (such as data transfer between users or connections to the Internet). A given user registered for circuit-switched services in a mobile system is primarily served by one MSC; while the same GMSC can serve transactions related to one or more MSCs and is, among other, in charge of querying for routing information of calls related to users served by said MSCs. Further details related to switching nodes in mobile systems can be found, for instance, in 3GPP specification 23.002 (v5.5.0; January 2002).

In order to provide interconnection between systems with different telecommunication technologies, specialized SPs are provided having gateway functions for converting between the various signaling protocols (and, optionally, media format) used.

In some existing implementations, the SPs are also in charge of media handling (i.e.: routing, transcoding, etc.) related to the services they are handling; while in other existing alternative implementations, media handling is done in specialized nodes that, in turn, are controlled from SPs that handle only the signaling. Examples of this latest alternative, related to mobile systems, can be found for instance in 3GPP specification 23.821 (v1.0.1; July 2000), that describe some switching points (MSC server, GMSC server) controlling specialized nodes for media handling (media gateways or MGW). Also, as described in said specification 23.821, and more detailed in 3GPP specification 23.002, a new kind of SP (called Call State Control Function, CSCFs) are in charge of handling signaling related to services that involve stations (STs) accessing the, so called, Internet Protocol Multimedia Subsystem (IM subsystem) in a UMTS system.

Specific characteristics related to stations (STs) depends to a large extent to the specific telecommunication technology of the system they are attached to. However, a point in common is that STs are addressed (i.e.: identified, called) by means of one (or more) identifier(s) that are associated to their respective users.

Users that are subscribers of a given operator are used to be assigned to one (or more) identifier that identifies said user and the station (end-point, terminal) he/she uses for accessing the services provided by said operator. Such identifiers can take various forms; such as E.164 numbers described in ITU recommendation E.164 (May 1997), or SIP-URIs (Session Initiation Protocol Uniform Resource Identifiers) as described in IETF's RFC-2543 "Session Initiation Protocol", SIP (March 1999).

Depending on the telecommunication technology used, the relationship between a given ST and the user using said ST can be a fixed or a flexible relationship. For instance, a user of a PSTN system does not need to indicate he/she is using a specific terminal; instead his/her terminal is identified automatically by a given identifier (e.g.: an E.164 number) assigned to the subscription of said user in said system. However, in some other systems, such as mobile systems or modern multimedia systems using, for instance, the aforementioned protocol SIP or other similar multimedia protocol (such as H.323 protocol, defined by ITU-T recommendation H.323, November 2000), a given ST does not usually get automatically an identifier related to a given user; instead, a user has to attach (register) within the system through said ST. Then, once a user has registered trough an ST, said ST gets identified within said system by means of the identifier (or identifiers) associated to said user, and can then be used for address and identify said user for further services (e.g.: to deliver calls to said ST when a call request is received indicating, for instance, an E.164 number of said user). This is achieved in some cases in an automatic manner. For instance, a user having a subscription into a mobile system, is usually provided with a SIM card (Subscriber Identity Module) that is intended to be plugged into a ST adapted to communicate with a mobile system (mobile station), and contains (at least) an identifier that identifies the subscription of the user it belongs to. Said identifier can be the so called IMSI (International Mobile Subscriber Identity), although other identifiers related to the subscription can be equally stored within the SIM (such as one or more E.164 numbers related to the subscription). So, when a user holding a subscription in a mobile system, turns on a mobile terminal that contains his/her SIM card, the mobile terminal runs (automatically) a registration procedure with the mobile system so the user gets automatically registered in said system from said mobile terminal; in turn, the mobile terminal gets identified within the mobile system by means of the identifier (or identifiers) associated to the subscription of said user (such as one or more E.164 numbers and an IMSI identifier).

Whenever in this application is referred the term "identifier" related to a given station (ST), it shall be generally be understood as concerning to an identifier (e.g.: E.164 number, SIP-URI, IMSI, etc.) associated to the user using said ST.

Additionally, telecommunications systems use to have serving functions that, depending on various factors (such as scalability, management, security, etc.) can be either: co-located with SPs, or located in dedicated servers (machines, nodes), as they are represented within FIG. 1 (xS). Examples of said serving functions are: the storage of subscriber data of the users, storage of users location information, storage of accounting information, network management, etc.

For example, in mobile systems a specialized server entity (known as Home Location Register, HLR, or Home Subscriber Server, HSS), is in charge, among other functions, of storing subscriber data and also attending queries from other SPs (or from other servers) whenever location information of a given user is needed, or even, to update said location information.

Other kind of server is the aforementioned payment server (PS). As described previously, a PS is a functional entity having service logic for managing accounting information for payment of services related to users of a telecommunications system, and uses to be regularly updated with events related to services served to the users it holds (e.g.: when a call from a given user from a given ST starts, when it is answered, when it ends, the dialed number used for the call, etc.).

A PS can be, for instance, allocated within a SP. In this case, for instance, it can hold accounting information of users whose terminals (ST) are connected to said SP, and would get informed, by means of internal communication means, about events related to services served to said STs. Alternatively, a PS can be, as cited previously, allocated within a specialized server (node) hosting uniquely a PS functional entity or hosting other specific service applications. In this case it gets informed about said events by external communication means; e.g.: through a signaling network via signaling links (13, 14).

An example of this latest alternative implementation for PS has been previously described with reference to the functional structuring of an Intelligent Network (IN).

Either implementation alternatives for a state-of-the-art PSs (allocated within SPs, or allocated in a specialized server), a PS entity handle (among other data) the accounting information for payment of services related to one or a plurality of users subscribed to a telecommunications system, wherein each of said users is identified by one (or more) identifier.

As cited previously with reference to the prior-art, upon reception of a service request from a given station (ST) (originating station), such as a call or a short message, a check is usually performed to determine if said service (originating service) can continue based on the actual accounting information of the user said ST belongs to. This kind of check is commonly done for services requested by users that are associated to pre-paid accounts.

In telecommunications systems having IN functionality, this check is usually done, together with other additional checks, service provisions, etc., that are performed in an early stage of the service request, by querying a SCP that host the SCF that contains the service logic for payment of services (i.e.: a payment server, PS) from the SP that has primarily received the originating service.

For instance, 3GPP specification 23.018 ("Basic Call Handling", v5.3.0, March 2002) discloses how a mobile originated call (i.e.: a call originated by a mobile station) is handled in a mobile system having CAMEL. There, it is detailed how the MSC serving said originating station, upon reception of a call request from it (message Setup), invokes, as a part of its functional requirements, a set of CAMEL procedures before further routing said call to another node; i.e.: before sending an ISUP (ISDN User Part) message IAM (InitialAddressMessage) to, normally, a GMSC; while details dealing with the specific CAMEL procedures are given in 3GPP specification 23.078 (v4.4.0, March 2002). According to the known art, at this moment in the MSC takes place the early check to determine if the call, at this stage, can proceed or not based on the accounting information associated to the originating station.

A similar situation occurs in telecommunications systems providing SMS (Short Message Service), such as mobile systems does, upon reception of a short message from an originating station (mobile originated SMS). In 3GPP specification 23.040 (v5.3.0, March 2002) the basic processing of SMS is detailed, while CAMEL specific details for SMS are given in 3GPP specification 23.078. In this latest specification it is detailed how CAMEL procedures are invoked from the MSC (or SGSN if the short message service is requested through the packet-switch domain of the mobile system) that receives the short message from an originating station it is serving (e.g.: reception of protocol data unit SMS-SUBMIT, represented by message transfer in FIG. 18a of specification 23.040), and before forwarding the short message to a SC (Short Message Service Centre, also noted as SMSC in other standard documents) (as represented by message forwardShortMessage in FIG. 18a of specification 23.040).

Also, for services that terminates in a given station (terminating services), similar IN based checks and service provisioning can be performed. According to the known art, said IN checks for terminating services are usually done by the telecommunications system operator that terminates the service (i.e.: by the operator wherein the terminating station belongs to), and are intended to provide some extra features related to terminating services. For example, for determining call distribution criteria of a call terminating into a given station (ST) (e.g.: by changing the destination terminal to which said call will finally be delivered), or for crediting the accounting information related to the station that terminates the call (terminating station).

Continuing, as an example case, with the state-of-art treatment of services in mobile systems having CAMEL, the handling of a mobile terminated call (i.e.: a call that terminates in a mobile station) is described, for instance, in specification 23.018 (aforementioned for the handling of mobile originated calls); while CAMEL specific details are given in specification 23.078. There, it is detailed how when a call gets to the GMSC (reception of InitialAddressMessage, IAM), said GMSC invokes, as a part of its functional requirements, a set of CAMEL procedures before forwarding the call (i.e.: forward the received IAM message) to the MSC that is serving to said terminating station. Also, CAMEL procedures are invoked in the GMSC when the terminating station answer the call (e.g.: reception in the GMSC of AnswerMessage, ANM, from the MSC serving said terminating station).

Similarly, as detailed in specification 23.018, the MSC serving to the terminating station invokes also CAMEL procedures before forwarding the terminating call to the terminating station, as well as when said terminating station answer said call.

Although technical realisations are not known to the inventors regarding CAMEL service invocation for terminating short messages; in fact, the handling of mobile terminated SMS it is presently disclosed in a draft version of specification 23.078 (v5D.13.41, February 2002) for CAMEL phase4 (ftp://ftp.3gpp.org/tsg_cn/WG2_camel/Draft_Specs/Archive_Re 1–5_Drafts/23078-5DD4.zip). According to said draft version, when a mobile terminating SMS is received from a Service Centre (SC) in the MSC (or SGSN) serving the destination user (e.g.: represented by message forwardShortMessage in FIG. 15a of specification 23.040), said MSC (or SGSN) shall invoke CAMEL procedures when delivering the SMS to the terminating station.

Figure 2:
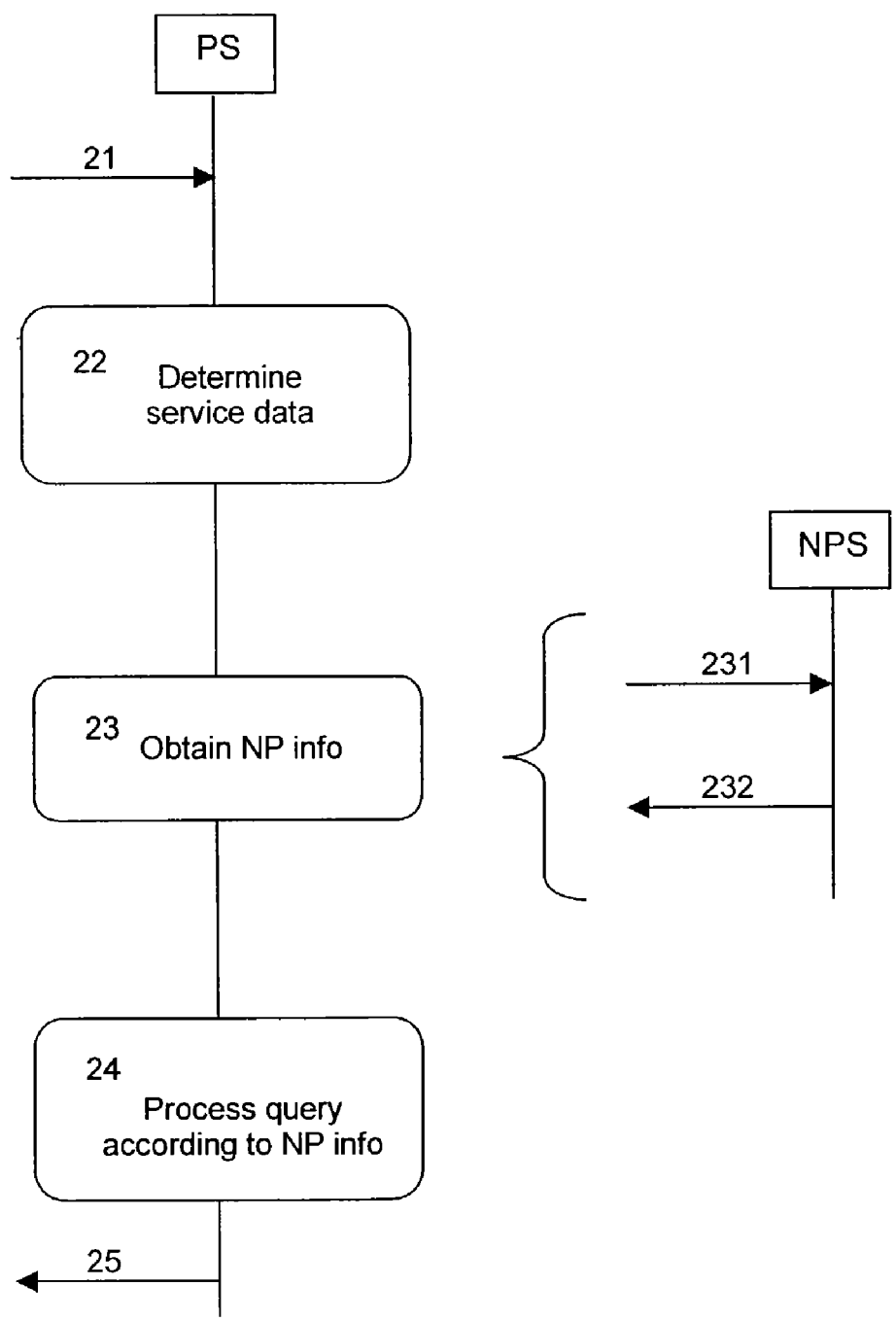
FIG. 2 shows a flowchart to handle the payment of a service in a payment server (PS) according to the present invention.

Reference is now made to FIG. 2 to illustrate the basic handling for payment of services in a PS according to the present invention; wherein steps 21, 22 and 25 are performed according to the state-of-the-art, and steps 23 and 24 are performed according to novel aspects of the invention.

In step 21, the PS receives a query, or a notification, for handling a service. The term "query" shall be used hereinafter since, as opposite to the term "notification", it implies a confirmation flow between the PS and the requesting (querying, notifying) entity, which uses to be commonly used in communications between SPs and a PS. For example, a confirmation flow between a SP and a PS allows to ensure that a given information have been properly received (and processed) by the PS, as well as it allows to the PS to provide further indications to the SP. However, as it should be understood hereinafter, if a communication between a SP and a PS is performed by simply sending notification to the PS, or by means of a query that will be answered by said PS, is not relevant for some aspects of the present invention.

The query of step 21 can be received, for instance, from a SP that is handling presently said service in a given execution point.

If the telecommunications system has, as described previously, an Intelligent Network (IN) for handling services, then the query is usually received within the SCP hosting the PS functionality by means of a CAP (or INAP) Initial_DP message sent from a SSF in said SP. In this case, communication means are provided both: in the SP and in the SCP to allow the exchange of said query as well as its corresponding answer. Said communication means can comprise, for instance, a communications stack such as, a SS#7 (Signaling System nr.7) stack: TCAP/SCCP/MTP (Transactions Capabilities, over Signaling Connection Control Part, over Message Transfer Part layers 3, 2 and 1); although other communications means comprising a different protocol stack could be used. An example of this can be the replacement of some SS#7 stack elements mentioned above by "adaptation layers" that accommodate an upper communication layer to smoothly communicate over a signaling network having different lower communication layers; such as by using M3UA for replacing MTP (as disclosed in IETF draft "SS7 MTP3-User Adaptation Layer"; February 2002; http://www.ietf.org/internet-drafts/draft-ietf-sigtran-m3ua-12.txt).

Said query usually comprise an identifier of a party involved in said service, or identifiers related to the parties involved in said service. For instance, if the service is related to a call between a given originating and a given terminating station, the query can comprise identifiers for both stations. If the service is, for instance, a SMS, the query can also contain an identifier of the SMS service centre through which the short message will be (or is being) delivered.

Since the PS usually needs some more data for managing accounting information for payment of services, the query, according to the state-of-the-art, usually contains some additional data related, for instance, to the state of the service as it is now; i.e.: the actual processing state for the requested service when it got to the detection point (DP) that caused the query. So, the query usually comprises information indicating if the service is processed as an originating service (e.g.: the query has been made while processing an outgoing call request from a given station) or as a terminating service (e.g.: the query has been made when processing an incoming call request, or an answer to an incoming call request, terminating in a given station). Then, in step 22, the PS determines the service logic to be applied based on the data received on the query, that can vary depending, for example, on the service being handled, on the present processing state of said service, in data associated to the particular identifier(s) of the ST(s) involved in the service that are managed (e.g.: accessed or held) by the PS, etc.

Processing means in a state-of-the-art PS would then process the query received in step 21 according to the data received in said query, and then, the PS would send back a response to said query (step 25). For instance, the processing can be based (among other) on a screening in said PS on any of the ST identifiers supplied in the query in order to verify if it belongs to the identification realm of a given operator (e.g.: if it belongs, for instance, to the E.164 number series of a given operator). However, according to an aspect of the present invention, in step 23 the PS queries a number portability system (NPS) for obtaining number portability information of any of the identifiers it have received within the query of step 21 prior to send a response in step 25.

As mentioned above, a user having subscription in a telecommunications system is assigned to identifier(s) that identify his/her subscription as well as the station (ST) said user is supposed to be reached. Said identifiers (such as E.164 numbers or SIP-URIs) were primarily intended to infer the location or even the network operator owning the subscription corresponding to said identifier (e.g.: by analysing the leading digits of an E.164 number that could identify the identification realm of a given operator, or the "domain" portion of a URI). However, the appearance of a plurality of operators, having each network domains in different location areas and/or offering different tariffs, led to the definition and standardization of different architectures for providing a number portability (NP) functionality that allows users of telecommunications systems to change their subscription with an operator to another one while keeping their (old) identifiers.

State-of-the-art NPSs are implemented according to different (normally standardized) requirements; however, most of them have in common that the NPS holds (or have access to) a NPDB (Number Portability Data Base) that contains a plurality of identifiers related to their corresponding portability information. So, for example, for an identifier such as an E.164 number that has been ported from the network domain of an operator "A" to the network domain of another operator "B", said NPDB contains the relationship between said (ported) E.164 number, and a routing number (as routing information, RI) that points out to the corresponding station within operator "B". Said routing number can be, for instance, the same E.164 number preceded by a prefix that addresses (e.g.: in routing tables of SPs) E.164 number series of a given operator, or a different. E.164 number. Therefore, upon reception of a query comprising a given identifier in a NPS, the NPS is arranged to answer back with the corresponding routing number. Alternatively, in some NPS implementations, if the identifier in the query has not been subject to portability, the answer sent back can comprise a ported indication information (referred hereinafter as PII) that indicates said event.

Examples of standardized solutions for number portability are defined for instance in ANSI proposed standards: T1.708 ("PCS 1900 Service Provider Number Portability"; T1P1.5/97-133R7; November 1997), or T1.711 ("Number Portability for PCS 1900 Short Message Service and other Services"; T1P1/99-026R1; April 1999) for the so called Local Number Portability; or in 3GPP specification 23.066 ("Support of Mobile Number Portability" v4.0.0; March 2001). This latest specification 23.066 includes two alternative technical realisations: the first one is based on an Intelligent Network (IN) architecture (IN based number portability), wherein a specialized SCF (referred hereinafter as NPDB-SCF) having access to a (co-located or not) NPDB takes care of NP queries; while the second one uses a signaling relay technology, by means of what is referred within specification 23.066 (and, hereinafter) as function MNP-SRF (Signaling Relay Function for support of Mobile Number Portability).

At this point, it shall be noticed that, according to general procedures for number portability queries described in the aforementioned specification 23.066, said queries are made from different switching points and domains depending, normally, on national regulations that rule how and from where queries to NPS shall be made in order to route services (calls, SMSs) to their final destinations when the identifiers that identify the destination of said services have been subject to portability. So, for example, for IN based number portability, only when the option is OQoD (Originating call Query on Digit Analysis), the query is made from the switching point serving to the originating station (i.e.: the MSC for a mobile system as shown in specification 23.066); being for the rest of the cases (Terminating call Query on Digit Analysis, TQoD; Query on HLR release, GoHR; and, in general queries made in the Number Range Holder Network) made from other switching points that takes care of the service once it has been primarily passed initial checks made in said switching point serving to the originating station, and even made from switching points beyond the domain of the originating operator.

A similar situation applies for signaling rely based queries to NPS, for the handling of both: call related signaling (for calls) and non-call related signaling (for SMSs); in which, the queries to the NPS are never made from the switching point serving to the originating station (i.e.: the MSC for a mobile system as shown in specification 23.066). In these cases, for call related signaling, the query is made by a subsequent switching point (GMSC) that receives the call request from the switching point serving primarily to the originating station (MSC); while for non-call related signaling the number portability queries are normally made from a switching point (e.g.: SMS-GMSC) that receives the SMS from the Service Centre that had store it.

As mentioned above, explanations given in NP standards, such as 23.066, shows the different solutions for routing services (calls, SMSs) to their final destination according to number portability; however, any entity (switching point, server, etc.) could get number portability information, provided that it uses the corresponding standardized procedure for making a number portability query.

For obtaining portability information related to a given identifier, a PS can use any state-of-the-art query according to any of the aforementioned standards for NP containing said identifier. Details for some of those well known queries to a NPS are now given. For instance, in case the NPS is implemented according to IN architecture, then the PS can send in step 231 a CAP or INAP message Initial_DP to query for portability information to the NPDB-SCF. In case of a NPS implemented as a signaling relay function, in step 231 the PS can send for example a MAP (Mobile Application Part) message SendRoutingInformation (SRI) to the MNP-SRF; or, alternatively, a MAP message AnyTimeInterrogation (ATI). For sending said queries to the NPS, as well as to receive the corresponding answers, a IN based PS can access, for example, the same communications stack as mentioned above (e.g.: a SS#7 stack TCAP/SCCP/MTP) available within the SCP said PS resides, and that is used for receiving (and answer to) other queries in the PS.

The portability information received by the PS in step 232 depends on several factors such as: if the identifier used in the query has been ported or not, configuration options in the queried NPS, in the type of query made to said NPS, etc.; according to this, the portability information received can comprise, for instance, routing information (RI) for the identifier used in the query and/or ported indication information (PIT). For example, if the query to the NPS was a CAP message Initial_DP, and the identifier has not been ported, then the answer to the query can be a CAP message Continue that does not contain parameters. In this same situation, if, instead, the identifier appears to be ported in the NPDB accessed by the NPS, then the answer to the query can be a CAP message Connect, that comprises (among other) a parameter that conveys the corresponding routing information for said identifier (i.e.: conveying an identifier that addresses a given ST in a given destination). Alternatively, if the identifier has not been ported, the NPS can also answer back with a CAP message Connect containing the same identifier as the one used in the query. If, for example, the query to the NPS was a MAP message SendRoutingInformation, the answer will be a MAP message SendRoutingInformationAcknowledge that conveys an identifier of a given station in a given destination (e.g.: a routing number that identifies a given station within, for instance, a given MSC).

Once the PS has received in step 232 the corresponding number portability information, in step 24, processing means in said PS process the query based (among other prior-art criteria not addressed by the present invention) on said portability information instead of based on the received identifiers, or in addition to them. For example, the PS can charge a given tariff according to the ported identifier of a given station, while logging information related to its original (non ported) identifier. Then, according to the state-of-the-art, the PS gives back in step 25 a response to the query received in step 21. Following with the example case of a IN based PS, the PS will answer back in step 25 to the SSF in the querying SP with a CAP (or INAP) message that, according to aforementioned specifications (3GPP 29.078 for CAP, or ETS 300 374-1 for INAP) are suitable for answering a query made with an Initial_DP message, such as a Continue message or a Connect message.

Figure 3:
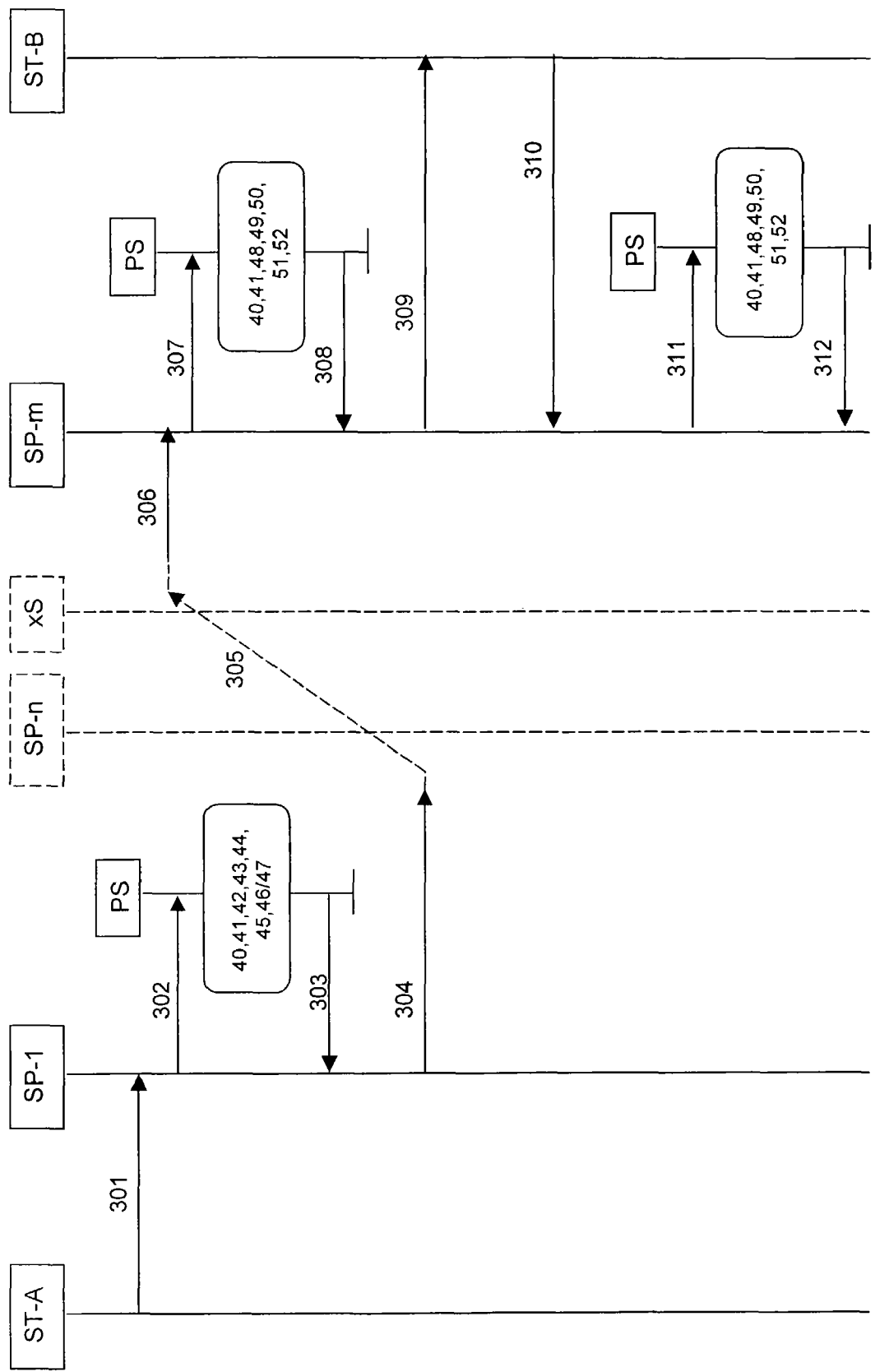
FIG. 3 shows a schematic signaling flow of a service requested from a station (ST-A) towards another station (ST-B), wherein said service is handled according to the present invention.

Reference is now made to FIG. 3 to illustrate the handling of a service request according to the present invention. For the sake of a greater clarity, signaling flow depicted in FIG. 3 has been simplified to show entities (e.g.: communication nodes, servers, etc.) that could be generic regardless a specific telecommunication technology and a specific service; therefore it does not show all possible entities that could be involved for a particular service according to a particular telecommunication technology nor the corresponding detailed signaling among them for said particular service and technology. However, details shall be given across the following descriptions to exemplify some specific services according to a specific telecommunication technology that, as it should be understood, does not limit the scope of the present invention.

In particular, steps 301 to 305 relate to the handling of an originating service request from an originating station (ST-A) to a terminating station (ST-B) according to the present invention; wherein, at least, the originating station (ST-A) is associated to accounting information for payment of services. The service request can be a call request from ST-A to ST-B, or a SMS from ST-A to ST-B, or any other service that is suitable to be charged to the accounting balance of ST-A and/or a registered as a service served to ST-A.

As mentioned earlier with reference to the prior-art, for the purpose of handling accounting information for payment of services, PS entities are provided with data related to the accounting information of all or part of the users subscribed to a given operator. A given PS can manage data related to pre-paid subscribers, post-paid subscribers, or both. For example, for a given subscriber said data can comprise the identifier(s) associated to said user (e.g.: E.164 number, SIP-URI, IMSI, etc.), and therefore, to the station assigned to (or registered to) said user, as well as the accounting information associated to said identifier(s). The accounting information, in turn, can be comprised of a set of registered events related to services served to the station (recorded for further calculation of the corresponding payment); additionally, it can also comprise the accounting balance corresponding to the payment of services served to it. Said accounting balance can be updated regularly according to the services served to said users; so, for instance, the accounting balance of a post-paid subscriber is increased with some served services, and the accounting balance of a pre-paid subscriber is decreased. Also, the accounting balance can be checked to determine if a given requested service can proceed or not based on it and based, for instance, also in the destination of the service.

State-of-the-art steps 301 and 302 represent, respectively, the request of a given service from a given station (ST-A) received in a SP serving to said station (SP-1) and the subsequent check against a PS for determining if, according to accounting information associated to said station (ST-A), said service request can further proceed to its destination (e.g.: towards station ST-B) (steps 304 and following steps), or shall be denied. Using, as an example case, the handling of an originating call request from a pre-paid subscriber in a mobile system having CAMEL, step 301 would represent the reception of a mobile originated call request (message setup) from a (originating) mobile station in the MSC serving said station. According to known processing techniques cited previously in connection with treatment of services in telecommunications systems having IN, and, more particularly, to mobile originated calls in mobile systems having CAMEL, the processing of the call request in said MSC would get a point in which, before further routing the call (e.g.: further sending an IAM message to a GMSC), an invocation to IN service logic shall be made. For instance, as it is disclosed in aforementioned specification 23.018, upon reception of a mobile originated call request from a given station, the MSC will run procedure OG_Call_Setup_MSC that, if CAMEL is implemented, will in turn invoke CAMEL procedure CAMEL_OCH_MS-C_INIT. This latest procedure is, together with other CAMEL specific procedures, further detailed in aforementioned specification 23.078, that shows a more detailed flows of internal interactions within switching points (such as MSCs, GMSCs, or SGSNs) between the basic service processing logic (described in 23.018) and the SSFs allocated in said switching points that are in charge of communicating with the SCFs. In particular (although not shown in signaling flows of specification 23.078), a CAP message Initial_DP is sent from said MSC (invoked by the SSF in said MSC) to a SCF in a SCP that contains the service logic for handling the call at this early stage (as it is represented in step 302). As mentioned above, for IN-based payment servers, the PS is implemented within a SCF and uses the communication means in the SCP where it resides for communicating with other entities (such as SSFs allocated in SPs). According to the IN logic for handling services, an Initial_DP can be used as a query for handling a service in a given moment, since it is usually sent when a given service gets a given execution point (determined, for example, by a detection point, DP). The Initial_DP thus contains a set of data that will address the specific application and will provide it with sufficient data for applying the corresponding service logic. In this particular case, and mostly (but not limited to) if the originating station (ST-A) is associated to a user having a pre-paid account, the Initial_DP will be handled (received and processed) by a PS, and usually contains the identifiers of both: the originating and terminating stations as well as information related to the detection point that caused the sending of said Initial_DP (e.g.: reception of a call request from ST-A).

The identifier of the terminating station is usually provided by the originating station (for example, the user using the originating station can dial the E.164 number associated to the terminating station), although other alternatives exist wherein, for instance, a call is automatically requested towards a given destination (e.g.: previously pre-programmed) as soon as the originating station request a call; while an identifier of the originating station can (depending on different telecommunication technologies) be either or both: provided by the originating station itself, or provided by a SP (e.g.: the SP serving the access to the originating station provides an identifier for it based on a relationship between a given access point—wherein said originating station is attached—, and a given identifier for it).

Similarly, step 301 could also represent a mobile originated SMS (short message service) requested from ST-A towards ST-B. In addition to the basic procedures for SMSs disclosed in specification 23.040, the aforementioned CAMEL specification 23.078 discloses details of handling of mobile originated SMS in a mobile system having CAMEL. In particular, for handling mobile originated SMSs, specification 23.078 cites a set of CAMEL procedures to be invoked from the MSC (or SGSN) receiving the SMS from the originating station; being one of them the CAMEL procedure CAMEL_O_SMS_INIT, which has an equivalent functionality for handling mobile originated SMSs as the procedure CAMEL_OCH_MSC_INIT, previously mentioned in relationship with the example of a mobile originated call (i.e.: Initial_DP message sent to a PS in step 302).

Figure 4:
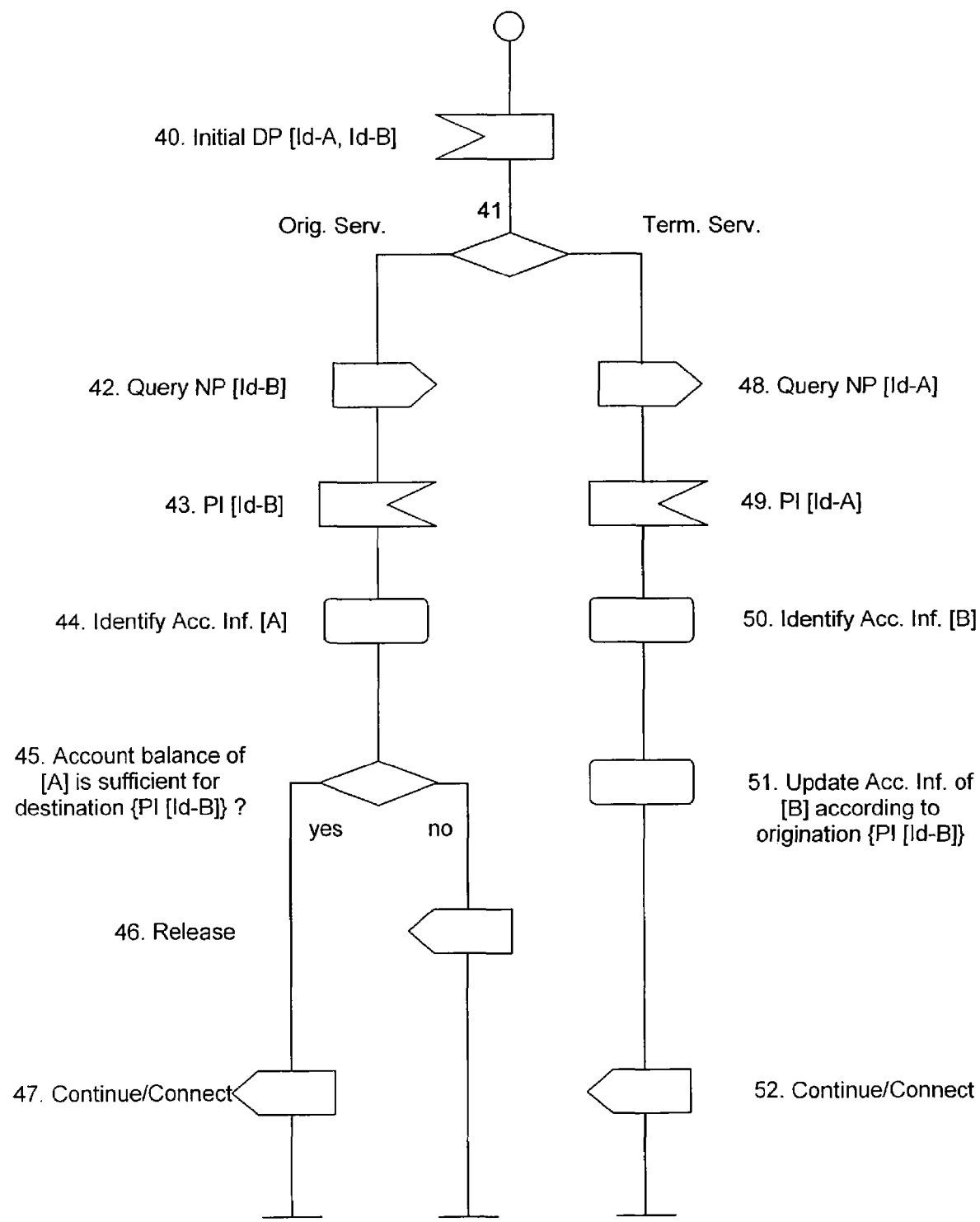
FIG. 4 shows a flowchart to handle a service request in a payment server (PS) according to the present invention.

Reference is now made to FIG. 4 to detail procedures performed in the PS upon reception of the query received in step 302 of FIG. 3, until it sends the corresponding answer in step 303.

A state-of-the-art PS would, for example, first determine the service data (as explained previously with reference to step 22 of FIG. 2). For the particular cases cited as examples of a call or a SMS requested from ST-A to ST-B, this step usually includes to identify the accounting information related to the identifier received for the calling party (e.g.: let's refer to it as "Id-A"); then, for example, if said identifier (Id-A) is associated to a pre-paid account, the PS would verify if the accounting balance of said pre-paid account is zero, or if it is not sufficient to make a call to the indicated destination (e.g.: let's refer to it as "Id-B"). Alternatively, if the identifier Id-A is associated to a post-paid account, the PS can verify if the accounting balance of said post-paid account has got a predefined limit (usually determined by the user). Also the service data determination in a state-of-the-art PS includes to determine if the query is made as an originating or terminating service (this, as mentioned earlier, can be inferred from information related to the detection point that caused the sending of the Initial_DP).

Step 40 in FIG. 4 represents the reception of a query in a PS for handling a service, wherein said query is an Initial_DP message. As explained above, the PS performs some processing to determine service data according to information received within the Initial_DP message. This is represented by step 41 (check box "Orig. Serv./Term. Serv"), that intends to represent the determination of the further treatment of the query: if as coming from an originating service, or from a terminating service, and by steps 44 or 50.

In this particular case since the query comes from an originating service (mobile originated call or mobile originated SMS), the execution flow will follow the branch on the left of FIG. 4 (steps 42 to 47). However, it shall be noticed that, although step 41 appears in FIG. 4 as preceding step 44 (or 50), their respective order can be reversed without affecting the scope of the invention.

Next, step 42 shows a novel aspect according to the present invention. At this point, the PS queries a number portability system NPS for obtaining number portability information of the identifier received for the destination (Id-B). The query to the NPS can be done, and the subsequent answer received, as described previously in relation to steps 231 and 232 of FIG. 2.

When the PS receives in step 43 the portability information (PI), it identifies in step 44 the accounting information related to the received identifier of the originating station (Id-A), and uses said portability information related to the identifier of said destination (PI) to determine in step 45 if the originating service (call, SMS) can proceed or not based on said portability information and based on the identified accounting information related to the originating station (ST-A).

So, for example, according to data accessible to a state-of-the-art PS, identifier Id-B can be related to a cheap tariff because, for example, belongs to a given operator (e.g.: operator-B) to which operator holding the subscription of user of ST-A (e.g.: operator-A) has special tariff agreements, or (e.g.: assuming an E.164 number) because it starts with digits that implies a local-charging tariff. In this case, said state-of-the-art PS would then make a wrong decision if it allows, for example, a call request indicating said identifier since said identifier Id-B has being subject to number portability and, presently, it belongs to, for example, another operator (e.g.: operator-C) to which operator-A has not said kind of special tariff agreements. Similarly, user assigned to said identifier Id-B, could have move to another geographical area while keeping the old identifier for making and receive calls on his/her terminal ST-B. The opposite situation could also take place and drive to a PS to deny service provision to ST-A because the accounting balance of its associated accounting information is not sufficient to, for instance, set up a call towards a station in the domain of operator-C, while, actually, due to number portability, the call would end up in the domain of operator-B. These problems are overcame by novel steps 42, 43 and 45 in the PS according to the present invention.

According to the result of the check made on step 45, the PS sends a suitable response to the query received in step 40. If the check yielded a negative result, then a CAP message suitable to give back a negative answer to a CAP message Initial_DP, will be sent. For example, a Release (Release_call, Release_SMS) will be sent back in step 46 to the SP that sent the query (SP-1). This will cause the service request to be denied to the originating station ST-A from said SP.

If, however, the check in step 45 yielded a positive result, then a CAP message suitable to give back a positive answer to a CAP message Initial_DP, will be sent. For example a Continue message or a Connect message can be sent back in step 47 to SP-1. As cited previously, CAP message Continue contains no parameters; its reception (according to aforementioned standard for CAMEL 23.078) in a switching point SP means a permission for the continuation of the service processing at the point it was before the query was made (message Initial_DP) without any modifications in the parameters of the service.

However, a CAP message Connect can (according to aforementioned standard for CAMEL 23.078) convey a set of different parameters; being one of them the parameter "Destination Routing Address" (called "Destination Subscriber Number" in case of Connect received as an answer to Initial_DP for mobile originated SMS) which is intended to make the querying SP (i.e.: the SP that sent the message Initial_DP) to modify the identifier for the destination of the service (call or SMS).

If, according to the portability information related to the identifier of ST-B received in step 43 (PI), it result that said identifier has not been ported, a Connect message sent back in step 47 containing the same (non ported) identifier received in the query (Id-b) would be sent. This would cause the querying SP (SP-1) to leave unmodified the identifier of the destination of the service and further route the service according to said identifier. If, however, according to the portability information related to the identifier of ST-B received in step 43 (PI), it results in that said identifier has been ported, and a (different) identifier that addresses said ST-B in a given destination was received as routing information (RI); said received identifier can be inserted by the PS in the Connect message sent back in step 47. As mentioned above, this would cause SP-1 to replace the identifier for the destination of the service. If the service was an originating call request to ST-B, now it shall be routed according to the new identifier received in the Connect message; and, optionally, further queries to the NPS that (according to the cited prior-art for number portability) should be made from subsequent nodes, can be avoided. If the service was an originating SMS request, then the identity of the destination station (ST-B, Id-B) shall be replaced, thus avoiding a further number portability query to the NPS when, later, the SMS is forwarded from the SMS Service Centre to be delivered to its final destination (ST-B).

Referring back to FIG. 3, step 303 represent the answer sent in any of the aforementioned steps 46 or 47 of FIG. 4.

As mentioned before, if the response received in step 303 is a negative response (Release_call, Release_SMS), then the originating service that caused the query in step 302 to be made, is rejected from SP-1 (not shown in FIG. 3).

Otherwise, if the response received in step 303 is a positive response (Continue, Connect), then SP-1 will further process the service (call, SMS).

In case the service is a mobile originated call request, this (as it is detailed for instance in aforementioned specification 23.018 for basic call handling) implies to forward the call to a GMSC; then, if the destination station (ST-B) is also a mobile station, the GMSC will request routing information to the corresponding home server (i.e.: an HLR or HSS), and then it will forward the call to the MSC that is currently serving to said ST-B. In case the service is a mobile originated SMS, then (as it is detailed in aforementioned specification 23.040 for basic handling of SMS) the MSC (or SGSN) will forward the short message, via an SMS-IWMSC (Interworking MSC for Short Message Service), to a SMS Service Centre that will store said short message before forwarding it to the destination station (ST-B), via a SMS-GMSC (Gateway MSC for Short Message Service) and via the MSC (or SGSN) serving to said ST-B.

Said steps of further processing and routing the service towards its final destination across switching points in the telecommunications system, including (if needed) the help of specific servers, are summarized in FIG. 3 with arrows 304 to 305 traversing various switching points (represented by "SP-n") and with the support of various servers (represented by xS).

Steps 306 to 312 relate to the handling of a terminating service request towards a terminating station (ST-B) from an originating station (ST-A) according to the present invention; wherein, at least, the terminating station (ST-B) is associated to accounting information for payment of services. As for previous steps 301 to 305, a call request from ST-A to ST-B, or a SMS from ST-A to ST-B, shall be used as examples of services.

As mentioned earlier, in addition to the basic handling of a terminating service (e.g.: actions to route and deliver the service to the terminating station), existing telecommunications systems can perform some additional actions (checks, service modifications, etc.) before delivering said service to the destination station, or even when the terminating service have been awarded by said station (e.g.: it answered an incoming call). In particular, as cited previously, telecommunications systems having IN functionality, use to perform said additional actions by means of IN operations (i.e.: queries made from the SSP in an SP to an SCF in an SCP, and the subsequent answers) similar to the ones previously described for performing additional actions for originating services. An example of one of these additional actions for terminating services is, as early mentioned with reference to the prior-art, are the ones that are implemented by some operators that have a policy to reward their subscribers when they terminate a service coming from another operator. So, for example, the accounting information associated to a given station that terminates a service (i.e.: a station acting as terminating station for a given service) is updated with every terminating service it receives (e.g.: by crediting its actual accounting balance, by registering said event for further assigning bonus points changeable for other kind of goods, etc.); being said updating made, as an operator determined implementation option, at different points of the terminating service processing; for example: before delivering the service to the terminating station, or once said terminating station has awarded the service, or both.

Step 306 in FIG. 3 represents the arrival of the service request to the SP (SP-M) serving to the destination station (ST-B).

Using, as an example case, the handling of a terminating call request towards a subscriber in a mobile system having CAMEL, step 306 would represent the reception of a mobile terminated call request (message IAM) in a GMSC entitled to terminate said call (i.e.: the GMSC of the operator where the destination station ST-B belongs to), or also in the MSC serving to the destination station (ST-B).

It shall be noticed that the call request can have various origination type; for example, it could have been originated from a mobile station in a mobile system (as in the example detailed with reference to steps 301 to 305 in FIG. 3); or it could have been originated in a station belonging to PSTN system. In any case (mobile originated or not), an ISUP message IAM (InitialAddressMessage) is received that conveys an identifier of the originating station as well as an identifier of the terminating station.

According to state-of-the-art processing techniques cited previously in relation with the handling of services in telecommunications systems having IN; and, specifically, in relation with the processing of mobile terminated calls in mobile systems having CAMEL, the processing of said terminating call in a GMSC, and also in the MSC serving to the destination station, will get some points (e.g.: detection points, DP) from where invocation to IN service logic shall take place by means of invocation of CAMEL procedures, wherein some of them (as previously mentioned for mobile originated calls) implies queries that will be made to a specific SCF (Service control function). In particular, as disclosed in the aforementioned specification 23.018 that details the basic call handling for mobile originated and mobile terminated calls, CAMEL procedures involving queries to an SCF are invoked before setting up the terminating call towards the terminating station, and also when the terminating call is answered from the terminating station.

As for the case of mobile originated calls and mobile originated SMS, details of the specific CAMEL procedures are also given in CAMEL specification 23.078, being the flow for making a query and for receiving the subsequent (appropriate) answer equally accomplished by means of exchanging CAP messages Initial_DP, for making the query, and Continue/Connect/Release (as appropriate) for answering it. Similarly, Initial_DP messages that are sent for handling terminating services contains sufficient data for applying the particular service logic; these data comprising information related to the processing point that triggered the sending of said Initial_DP (i.e.: to, primarily, determine that it is a terminating service), as well as the identifiers of the parties (originating and terminating parties) involved in said service.

Therefore, operators that rewards the termination of services by means of updating the accounting information associated to the station that terminates a service, and that have an IN for controlling the high layer aspects of services, use to utilize the queries made from said detection points to implement said policy. In this way, a PS which is implemented in a SCF can, upon reception of any of said queries (represented by numerals 307 or 311 in FIG. 3), act upon the associated accounting information of the corresponding terminating station indicated in the query.

In particular, step 307 represents a query (message Initial_DP) sent from a GMSC or from a MSC before delivering the call to the terminating station (ST-B). As disclosed in specification 23.018 for the functional requirements of a GMSC for handling a mobile terminated call, upon reception of an IAM message, said GMSC will run procedure Obtain_Routeing_Address before further routing the call (e.g.: before forwarding the IAM to the MSC serving the terminating station). Said procedure, if CAMEL is implemented, will in turn invoke procedure CAMEL_MT_GMSC_INIT. Also, specification 23.018 discloses the functional requirements of a MSC serving a given station for handling a mobile terminating call to said station. As a part of said functional requirements in said MSC is the invocation of procedure ICH_MSC that, in turn, invokes CAMEL procedure CAMEL_ICH_MSC_INIT.

As other CAMEL procedures, procedures CAMEL_MT_GMSC_INIT and CAMEL_ICH_MSC_INIT are further detailed in specification 23.078, wherein the internal request made to the SSF in, respectively, the GMSC or the MSC for sending an Initial_DP is specified.

On the other hand, step 311 represents a query (message Initial_DP) sent from a GMSC or from a MSC once the call has been answered by the terminating station (ST-B), as represented by step 310. As disclosed in specification 23.018 for the functional requirements of a MSC handling a terminating call to a mobile station, process Complete_Call_In_MSC, which is invoked at reception of the answer from the terminating station, invokes in turn to CAMEL procedure CAMEL_MT_GMSC_ANSWER before forwarding back the received answer to the GMSC. Also, in the GMSC, as stated in specification 23.018 within process MT_GMSC, upon reception of the answer of a terminating call, the same CAMEL procedure CAMEL_MT_GMSC_ANSWER as in the MSC is invoked, that, as stated in CAMEL specification 23.078 triggers a request for the sending of an Initial_DP message.

Similarly, step 306 of FIG. 3 could also represent the reception of a mobile terminated SMS requested towards station ST-B in the MSC (or SGSN) serving to said station; while steps 307 and 311 would represent similar queries, and with the same purpose, as the ones described above for a mobile terminating call.

As it was cited before in relation with mobile originated SMS, the short message sent from the originating station (ST-A) was stored in a SMS Service Centre, and is received in said MSC (or SGSN) from said SMS Service Centre, via a SMS-GMSC. However, in addition to a mobile terminal, there can be various entities that can originate short messages. For example, a given server can originate a short message to be delivered to one (or a plurality) of mobile terminals for various purposes (for instance: advertising, notification of lost calls, etc.). In any case, a MAP message forwardShortMessage containing an identifier of the originating end-point and an identifier for the destination station is received for a mobile terminated SMS in said MSC or said SGSN, as disclosed in the aforementioned specification 23.040 that describes the basic handling of the Short Message Service.

CAMEL service invocation for terminating short messages is described in the aforementioned draft version of specification 23.078 (v5D.13.41, February 2002) for CAMEL phase4. In said draft version, there are two procedures that are respectively performed when the short message is received in the MSC (or SGSN), and when said MSC (or SGSN) has successfully delivered the short message to the terminating station: the first one is the procedure CAMEL_T_SMS_INIT, and the second one is the procedure CAMEL_T_SMS_DELIVERED; both producing a query, in the form of an Initial_DP message, to be sent to the SCF where the PS is implemented; so, procedure CAMEL_T_SMS_INIT would produce the query represented in step 307, while procedure CAMEL_T_SMS_DELIVERED would produce the one represented in step 311.

Reference is now made again to FIG. 4 to detail the procedures performed in the PS upon reception of any of the queries depicted in steps 307 or 311 of FIG. 3, until it sends the corresponding answers in steps 308 or 308.

As cited previously, for the purpose of updating accounting information with terminating services, several (operator determined) options can exist that determine if only one query per terminating service request is sent to the PS, or more than one are sent (e.g.: a query is sent before delivering the service to the terminating station, a query is sent once the service have been awarded from it, or a query is sent in both situations). For the purpose of the present invention it is only relevant that, at least, one query is sent per terminating service request received; being not relevant if said query is made before delivering the terminating service to the terminating station, or once it has been delivered to it or awarded to it, or in all these situations. Also, details in the service logic in said PS concerning to specific differentiated actions over the accounting information associated to the terminating station in cases wherein more than one query is sent to the PS for the same terminating service, are aspects beyond the scope of the present invention; being only relevant for the invention those actions that are taken based on the identifier of the originating station.

State-of-the art steps 40 and 41 runs as described before for handling a query of an originating service; being the differences starting from step 41 onwards, since in said step it is determined from the data contained in said query that it comes from the basic processing of a terminating service; therefore, the execution flow will now follow the branch on the right of FIG. 4. It shall be notice also here that the order of some steps depicted in FIG. 4 intends only to represent a possible alternative regarding at what time they are performed; wherein, for example, step 50 could precede step 41.

Step 48 represents a novel aspect according to the present invention. In said step the PS selects the received identifier of the originating station (Id-A) and queries a number portability system NPS for obtaining number portability information related to said identifier (PI). The query to the NPS can be done as described earlier with reference to step 231 of FIG. 2; while the answer to said query is received in step 49 as it was described with reference to step 232 in the same figure.

In step 50, the PS uses the received identifier of the terminating station (Id-B) to identify the accounting information associated to said terminating station (ST-B). In step 51, the PS updates appropriately said accounting information according to the obtained portability information (PI). So, for example, the PS can credit its actual accounting balance according to the geographical location (or originator operator) indicated by the routing information received from the NPS. Alternatively, or additionally, it can register the event of the termination of the service requested by a originating station identified by said routing information.

Next, in step 52, the PS sends back a suitable response to the query received in step 40 to the SP that make said query (SP-m). Assuming said query was a CAP message Initial_DP, the answer can be, for example, a CAP message Continue or Connect.

Referring back to FIG. 3, step 308 represents the answer to the query made from SP-m upon the reception of the terminating service request.

For the particular case of a mobile terminated call, if the query was made by the GMSC, then (according to aforementioned specifications), upon reception of a positive answer (such as a Continue or Connect message), it will continue the execution of the service request and will forward the terminating call request to the MSC serving the terminating station ST-B (not represented in FIG. 3, that does not detail the separate processing of terminating calls in GMSC and MSC according to specific procedures of mobile systems). If the query was made by the MSC serving the terminating station ST-B, upon reception of a positive answer, it will forward the terminating call to said station ST-B, as represented by step 309.

Similarly, for the specific case of a mobile terminated SMS, step 309 would represent the delivery of the short message to the terminating station ST-B from the MSC or SGSN serving said terminating station ST-B. Step 312 represents answer for a query made from SP-m upon the completion of the terminating service.

For example, for the particular case of a mobile terminated call if the query was made from a MSC at reception of the answer from the terminating station ST-B, upon reception of a positive answer, said MSC would (according to aforementioned specifications) notify back said event to the GMSC (not represented in the figure). Likewise, if the query was made from a GMSC at reception of an answer notified from the MSC serving the terminating station, said GMSC will notify back said answer to the preceding SP (not represented in the figure).

Similarly, for the specific case of a mobile terminated SMS, if the query was made by the MSC or SGSN once the short message was successfully delivered to the terminating station, the reception of a positive answer will cause the normal execution, that can consist, for instance, in sending back a successful delivery report to the preceding SP (e.g.: SMS-GMSC).

The invention claimed is:

1. A method for handling a service request in a telecommunications system from a first station (ST-A) to a second station (ST-B), said first station (ST-A) being associated to accounting information, said method comprising the steps of:

a) receiving a service request from said first station (ST-A), said service request comprising an identifier (Id-B) of said second station (ST-B);

b) identifying the accounting information related to said first station (ST-A);

c) obtaining number portability information related to said identifier of said second station (PI); and d) checking if said service can proceed based on said portability information and said accounting information;

wherein said service request is received in a switching point of said telecommunications system, and wherein the steps b), c) and d) further comprise the steps of:

b1) sending from said switching point (SP, MSC, SGSN) a first query for handling said service to a payment server entity (PS), said payment server entity (PS) including service logic for handling accounting information for payment of services, said first query comprising said identifier (Id-B) of said second station (ST-B) and an identifier (Id-A) of said first station (ST-A);

b2) using in said payment server entity (PS) said identifier of said first station (Id-A) for identifying the accounting information related to said first station (ST-A);

c1) sending from said payment server entity (PS) a second query for obtaining number portability information to a number portability server entity (NPS, NPDB-SGF, MNP-SRF), said second query comprising said identifier of said second station (Id-B);

c2) receiving a response to said second query in said payment server entity (PS), said response comprising portability information for said identifier of said second station (PI);

d1) checking in said payment server entity (PS) if said service can proceed based on said accounting information related to said first station (ST-A) and said portability information; and d2) sending a response to said first query from said payment server entity (PS) to said switching point (SP, MSC, SGSN) based on said check.

2. The method of claim 1, wherein said service request is a call request from said first station (ST-A) to said second station (ST-B).

3. The method of claim 1, wherein said service request is a short message service request from said first station (ST-A) to said second station (ST-B).

4. The method of claim 1, wherein the response to said first query comprises said portability information, and wherein said method further comprises the step of routing in said switching point (SP, MSC, SGSN) said service request according to said received portability information.

5. The method of claim 1, wherein said accounting information comprises an accounting balance.

6. A method for handling a service request in a telecommunications system from a first station (ST-A) to a second station (ST-B), said second station (ST-B) being associated to accounting information, said method comprising the steps of:
   a) receiving a service request for said second station (ST-B), said service request comprising an identifier (Id-A) of said first station (ST-A);
   b) obtaining number portability information related to said identifier of said first station (PI);
   c) identifying the accounting information related to said second station (ST-B); and
   d) updating accounting information related to said second station (ST-B) based on said portability information;
   wherein said service request is received in a switching point (SPMSC, SGSN) of said telecommunications system, and wherein the steps b), c) and d) further comprise the steps of:
   b1) sending from said switching point (SP, MSG, SGSN) a first query for handling said service to a payment server entity (PS), said payment server entity (PS) including service logic for handling accounting information for payment of services, said first query comprising said identifier (Id-A) of said first station (ST-A) and an identifier (Id-B) of said second station (ST-B);
   b2) using in said payment server entity (PS) said identifier of said second station (Id-B) for identifying the accounting information related to said second station (ST-B);
   c1) sending from said payment server entity (PS) a second query for obtaining number portability information to a number portability server entity (NPS, NPDB-SCF, MNP-SRF), said second query comprising said identifier of said first station (Id-A);
   c2) receiving a response to said second query in said payment server entity (PS), said response comprising portability information for said identifier of said first station (PI);
   d1) updating in said payment server entity (PS) accounting information related to said second station (ST-B) based on said portability information; and
   d2) sending a response to said first query from said payment server entity (PS) to said switching point (SP, MSC, SGSN) for continue the further handling of said service request.

7. The method of claim 6, wherein said service request is a call request from said first station (ST-A) to said second station (ST-B).

8. The method of claim 6, wherein said service request is a short message service request from said first station (ST-A) to said second station (ST-B).

9. The method of claim 6, wherein said accounting information comprises an accounting balance, and wherein the step d) comprises the step of crediting said accounting balance.

10. The method of claim 6, wherein said accounting information comprises an accounting balance, and wherein the step d1) comprises the step of crediting the accounting balance associated to said accounting information.

11. A telecommunications system for handling a service request from a first station (ST-A) to a second station (ST-B), said system comprising:
   storage means, adapted to store accounting information related to said first station (ST-A);
   communication means, adapted to receive a service request from said first station (ST-A), said service request comprising an identifier (Id-B) of said second station (ST-B);
   processing means, adapted to identify accounting information related to said first station (ST-A) and for checking if said service request can proceed based on said accounting information and on said identifier of said second station (Id-B); and
   routing means, adapted to route said service request according to said identifier of said second station (Id-B);
   wherein said communication means are adapted for obtaining number portability information related to said identifier of said second station (PI); and
   wherein said processing means are adapted for checking if said service can proceed based on said accounting information and on said portability information;
   further comprising a payment server (PS), a switching point (SP, MSC, SGSN). and a number portability server (NPS, NPDB-SCF, MNP-SRF), wherein:
   said switching point (SP, MSC, SGSN) comprises:
      communication means adapted for querying said payment server (PS) upon reception of said service request for handling said service, said query comprising said identifier (Id-B) for said second station (ST-B) and an identifier (Id-A) of said first station (ST-A);
   said payment server (PS) comprises:
      storage means;
      processing means; and
      communication means adapted to receive a query for handling a service; said number portability server (NPS, NPDB-SCF, MNP-SRF) is adapted to receive a query requesting number portability information related to an identifier of a station; and wherein:
         communication means in said payment server (PS) are further adapted for querying to said number portability server (NPS, NPDB-SCF, MNP-SRF) to obtain number portability information related to said identifier of said second station, (PI), said query comprising said identifier of said second station (Id-B); and
         processing means in said payment server (PS) are further adapted for checking if said service can proceed based on said accounting information and on said portability information.

12. The system of claim 11, wherein said service request is a call request from said first station (ST-A) to said second station (ST-B).

13. The system of claim 11, wherein said service request is a short message service request from said first station (ST-A) to said second station (ST-B).

14. The system of claim 11, wherein:
said communication means in said payment server (PS) are further adapted to include said portability information in the answer to the query of said switching point (SP, MSC, SGSN); and
said routing means in said switching point (SP, MSC, SGSN) are further adapted to route said service request according to said portability information.

15. The system of claim 11, wherein said accounting information comprises an accounting balance.

16. A telecommunications system for handling a service request from a first station (ST-A) to a second station (ST-B), said system comprising:
storage means, adapted to store accounting information related to said second station (ST-B);
communication means, adapted to receive a service request to said second station (ST-B), said service request comprising an identifier (Id-A) of said first station (ST-A); and
processing means for handling said service request to said second station (ST-B);
wherein said communication means are further adapted for obtaining number portability information related to said identifier of said first station (PI); and
wherein said processing means are further adapted for updating accounting information related to said second station (ST-B) based on said portability information;
further comprising: a payment server (PS), a switching point (SP, MSC, SGSN), and a number portability server (NPS, NPDB-SGF, MNP-SRF); wherein:
said switching point (SP, MSC, SGSN) comprises:
communication means adapted for querying to said payment server (PS) upon reception of said service request for handling said service, said query comprising said identifier (Id-A) for said first station (ST-A) and an identifier (Id-B) of said second station (ST-B);
said payment server (PS) comprises:
storage means;
processing means; and
communication means adapted to receive a query for handling a service; said number portability server (NPS, NPDB-SCF, MNP-SRF) is adapted to receive a query requesting number portability information related to an identifier of a station; and wherein:
said communication means in said payment server (PS) are further adapted for querying to said number portability server (NPS, NPDB-SCF, MNP-SRF) to obtain number portability information related to said identifier of said first station (PI), said query comprising said identifier of said first station (Id-A); and
said processing means in said payment server (PS) are further adapted for updating accounting information related to said second station (ST-B) based on said portability information.

17. The system of claim 16, wherein said service request is a call request from said first station (ST-A) to said second station (ST-B).

18. The system of claim 16, wherein said service request is a short message service request from said first station (ST-A) to said second station (ST-B).

19. The system of claim 16, wherein said accounting information comprises an accounting balance, and wherein said processing means are further adapted for crediting said accounting balance.

20. The system of claim 16, wherein said accounting information comprises an accounting balance, and wherein said processing means are further adapted for crediting said accounting balance.

21. A method for handling a service in a payment server (PS) arranged for updating the balance of a payment account associated to a station (ST-A, ST-B) according to the services served to said station in a telecommunications system (10), the method comprising the steps of:
receiving (40) in said payment server a first query for handling a service between an originating station (ST-A) and a terminating station (ST-B), said first query comprising an identifier of said originating station (Id-A) and an identifier of said terminating station (Id-B),
determining (41) whether the service is being handled as an originating service or as a terminating service, and, responsive to the determination that the service is being handled as an originating service, comprising the steps of:
identifying (44) a payment account associated to said originating station (ST-A),
sending (42) from the payment server a second query comprising said identifier of said terminating station (Id-B) to a number portability server (NPS),
receiving (43) in the payment server a response to said second query comprising number portability information related to said identifier (PI),
checking whether said service can proceed or not based on the balance of said payment account and a charging tariff associated to the obtained number portability information (PI), when the obtained portability information indicates that the identifier of said terminating station has been ported, and
sending (46, 47) a response to said first query according to the result of said check.

22. The method of claim 21, wherein, responsive to the determination that the service is being handled as an originating service, further comprises the step of:
applying said selected charging tariff for debiting the balance of said payment account associated to said originating station (ST-A) for said service.

23. The method of claim 21, wherein the response to said first query comprises said number portability information (PI).

24. The method of claim 21, wherein, responsive to the determination that the service is being handled as a terminating service, comprises the steps of:
identifying (50) a payment account associated to said terminating station (ST-B),
sending (48) a second query comprising said identifier of said originating station (Id-A) to a number portability server (NPS),
receiving (49) a response to said second query comprising number portability information related to said identifier (PI), and
crediting (51) the balance of said payment account associated to said terminating station (ST-B) if the obtained portability information (PI) of the identifier of said originating station indicates that it belongs to an operator which is not the operator of the terminating station.

25. The method of claim 21, wherein the step of sending said second query comprises the step of sending a CAMEL Application Part message Initial_DP to an Intelligent Network-based number portability server (NPS).

26. The method of claim 21, wherein the step of sending said second query comprises the step of sending a Mobile Application Part message AnyTimeInterrogation to a Signaling Relay-based number portability server (NPS).

27. Apparatus (PS) for updating the balance of a payment account associated to a station (ST-A, ST-B) according to the services served to said station in a telecommunications system (10), the apparatus comprising:
communication means arranged to receive a first query (40) for handling a service between an originating station (ST-A) and a terminating station (ST-B), said first query comprising an identifier of said originating station (Id-A) and an identifier of said terminating station (Id-B), and
processing means responsive to the reception of said first query so as to determine (41) whether the service is being handled as an originating service or as a terminating service, and, responsive to the determination that the service is being handled as an originating service, being arranged to: identify (44) a payment account associated to said originating station (ST-A), check (45) whether said service can proceed or not based on the balance of said payment account, and prompt said communication means to send a response (46, 47) to said first query according to the result of said check; wherein:
said communication means are further arranged to send a second query (42, 48) comprising an identifier of a station (Id-A, Id-B) to a number portability server (NPS), and to receive a response (43, 49) to said second query comprising number portability information related to said identifier (PI, PI), and
said processing means are responsive to said determination so as to prompt said communication means to send a said second query (42) comprising said identifier of said terminating station (Id-B), and to check whether said service can proceed or not based on the balance of said payment account and a charging tariff associated to the obtained number portability information (43, PI) when the obtained portability information indicates that the identifier of said terminating station has been ported.

28. The apparatus of claim 27, wherein, responsive to the determination that the service is being handled as an originating service, said processing means are further arranged to apply said selected charging tariff for debiting the balance of said payment account associated to said originating station (ST-A) for said service.

29. The apparatus of claim 27, wherein said communication means are further arranged to include said number portability information (PI) in the response (46, 47) to said first query.

30. The apparatus of claim 27, wherein, responsive to the determination that the service is being handled as a terminating service, said processing means are further arranged to: identify (50) a payment account associated to said terminating station (ST-B), prompt said communication means to send a second query (48) comprising the identifier of said originating station (Id-A) to a number portability server (NPS), and credit (51) the balance of said payment account associated to said terminating station (ST-B) if the obtained portability information (49, PI) of the identifier of said originating station indicates that it belongs to an operator which is not the operator of the terminating station.

31. The apparatus of claim 27, wherein said communication means are arranged to send said second query in a CAMEL Application Part message Initial_DP to an Intelligent Network-based number portability server (NPS).

32. The apparatus of claim 27, wherein said communication means are arranged to send said second query in a Mobile Application Part message AnyTimeInterrogation to a Signaling Relay-based number portability server (NPS).

* * * * *

UNITED STATES PATENT AND TRADEMARK OFFICE
CERTIFICATE OF CORRECTION

| | |
|---|---|
| PATENT NO. | : 7,218,712 B2 |
| APPLICATION NO. | : 10/610866 |
| DATED | : May 15, 2007 |
| INVENTOR(S) | : de Nicolas et al. |

It is certified that error appears in the above-identified patent and that said Letters Patent is hereby corrected as shown below:

On the Title Page, Item (56)
On Page 2, under "OTHER PUBLICATIONS", Line 15, after "Internet" insert -- : --.

On the Title Page, Item (56)
On Page 2, under "OTHER PUBLICATIONS", Line 16, delete "shtml" and insert -- .shtml --, therefor.

In Column 4, Line 13, delete "dialed" and insert -- dialled --, therefor.

In Column 8, Line 28, delete "dialed" and insert -- dialled --, therefor.

In Column 12, Line 37, delete "GoHR" and insert -- QoHR --, therefor.

In Column 13, Line 21, delete "(PIT)" and insert -- (PII) --, therefor.

In Column 17, Line 32, delete "(PI)" and insert -- (PI[Id-B]) --, therefor.

In Column 17, Line 40, delete "(PI)" and insert -- (PI[Id-B]) --, therefor.

In Column 21, Line 34, delete "(PI)" and insert -- (PI[Id-A]) --, therefor.

In Column 21, Line 43, delete "(PI)" and insert -- (PI[Id-A]) --, therefor.

In Column 22, Line 41, in Claim 1, delete "(PI)" and insert -- (PI[Id-B]) --, therefor.

In Column 22, Line 61, in Claim 1, delete "SGF" and insert -- SCF --, therefor.

In Column 22, Line 67, in Claim 1, delete "(PI)" and insert -- (PI[Id-B]) --, therefor.

In Column 23, Line 31, in Claim 6, delete "(PI)" and insert -- (PI[Id-A]) --, therefor.

In Column 23, Line 37, in Claim 6, delete "(SPMSC, SGSN)" and insert -- (SP, MSC, SGSN) --, therefor.

In Column 23, Line 40, in Claim 6, delete "MSG" and insert -- MSC --, therefor.

UNITED STATES PATENT AND TRADEMARK OFFICE
CERTIFICATE OF CORRECTION

PATENT NO.       : 7,218,712 B2
APPLICATION NO.  : 10/610866
DATED            : May 15, 2007
INVENTOR(S)      : de Nicolas et al.

It is certified that error appears in the above-identified patent and that said Letters Patent is hereby corrected as shown below:

In Column 23, Line 60, in Claim 6, delete "(PI)" and insert -- (PI[Id-A]) --, therefor.

In Column 24, Line 35, in Claim 11, delete "(PI)" and insert -- (PI[Id-B]) --, therefor.

In Column 24, Line 40, in Claim 11, after "SGSN)" delete "." and insert -- , --, therefor.

In Column 24, Line 61, in Claim 11, delete ", (PI)" and insert -- (PI[Id-B]) --, therefor.

In Column 25, Line 31, in Claim 16, delete "(PI)" and insert -- (PI[Id-A]) --, therefor.

In Column 25, Line 37, in Claim 16, delete "SGF" and insert -- SCF --, therefor.

In Column 25, Line 56, in Claim 16, delete "(PI)" and insert -- (PI[Id-A]) --, therefor.

In Column 26, Line 32, in Claim 21, delete "(PI)" and insert -- (PI[Id-B]) --, therefor.

In Column 26, Line 36, in Claim 21, delete "(PI)" and insert -- (PI[Id-B]) --, therefor.

In Column 26, Line 49, in Claim 23, delete "(PI)" and insert -- (PI[Id-B]) --, therefor.

In Column 26, Line 60, in Claim 24, delete "(PI)" and insert -- (PI[Id-A]) --, therefor.

In Column 26, Line 63, in Claim 24, delete "(PI)" and insert -- (PI[Id-A]) --, therefor.

In Column 27, Line 34, in Claim 27, delete "(PI, PI)" and insert
-- (PI[Id-A], PI[Id-B]) --, therefor.

In Column 28, Line 3, in Claim 27, delete "(43, PI)" and insert -- (43, PI[Id-B]) --, therefor.

UNITED STATES PATENT AND TRADEMARK OFFICE
CERTIFICATE OF CORRECTION

PATENT NO.       : 7,218,712 B2
APPLICATION NO.  : 10/610866
DATED            : May 15, 2007
INVENTOR(S)      : de Nicolas et al.

It is certified that error appears in the above-identified patent and that said Letters Patent is hereby corrected as shown below:

In Column 28, Line 15, in Claim 29, delete "(PI)" and insert -- (PI[Id-B]) --, therefor.

In Column 28, Line 26, in Claim 30, delete "(49, PI)" and insert -- (49, PI[Id-A]) --, therefor.

Signed and Sealed this

Fifteenth Day of July, 2008

JON W. DUDAS
*Director of the United States Patent and Trademark Office*